United States Patent
Day et al.

(10) Patent No.: US 11,864,510 B2
(45) Date of Patent: Jan. 9, 2024

(54) HVAC SYSTEM FOR INDOOR AGRICULTURE

(71) Applicant: Trane International Inc., Davidson, NC (US)

(72) Inventors: Michael Sean Day, Sacramento, CA (US); Aaron E. Opatz, Maple Grove, MN (US); Lane A. Liudahl, Holmen, WI (US)

(73) Assignee: Trane International Inc., Davidson, NC (US)

( * ) Notice: Subject to any disclaimer, the term of this patent is extended or adjusted under 35 U.S.C. 154(b) by 356 days.

(21) Appl. No.: 17/323,761

(22) Filed: May 18, 2021

(65) Prior Publication Data

US 2021/0352853 A1 Nov. 18, 2021

Related U.S. Application Data

(60) Provisional application No. 63/026,384, filed on May 18, 2020.

(51) Int. Cl.
*A01G 9/24* (2006.01)

(52) U.S. Cl.
CPC ................... *A01G 9/246* (2013.01)

(58) Field of Classification Search
CPC .......... A01G 9/246; A01G 9/24; A01G 13/08
See application file for complete search history.

(56) References Cited

U.S. PATENT DOCUMENTS

| | | | | |
|---|---|---|---|---|
| 3,989,187 A | * | 11/1976 | Osheroff | F24F 11/00 236/80 D |
| 5,931,227 A | * | 8/1999 | Graves | F24F 11/46 165/216 |
| 5,953,926 A | | 9/1999 | Dressler et al. | |
| 2010/0307731 A1 | | 12/2010 | Yonezawa et al. | |
| 2017/0167775 A1 | * | 6/2017 | Shin | F25D 17/08 |
| 2017/0203631 A1 | * | 7/2017 | Ryu | B60H 1/22 |
| 2018/0361824 A1 | * | 12/2018 | Ryu | B60H 1/32 |
| 2019/0338974 A1 | | 11/2019 | Turney et al. | |

FOREIGN PATENT DOCUMENTS

| | | | |
|---|---|---|---|
| CN | 113736630 A | * | 12/2021 |
| JP | 2010159928 A | | 7/2010 |
| JP | 2011188785 A | | 9/2011 |
| JP | 2016169908 A | | 9/2016 |
| KR | 20090114025 | * | 4/2008 |

OTHER PUBLICATIONS

International Search Report from the corresponding International Application No. PCT/IB2021/054284 dated Jul. 26, 2021.

* cited by examiner

*Primary Examiner* — Monica L Perry
(74) *Attorney, Agent, or Firm* — WOMBLE BOND DICKINSON (US) LLP

(57) ABSTRACT

Multiple air handling units feeding into a common air distribution system are used to provide both latent and sensible temperature control. When dehumidification without sensible cooling is required, different air handling units feeding into a common distribution system may be operated in different modes so that both cooling and reheating are occurring simultaneously. The result is an energy efficient means of controlling both ambient air temperature and relative humidity. Air handling units such as water source heat pumps and variable refrigerant flow (VRF) units may be employed.

20 Claims, 11 Drawing Sheets

| MAX COOLING LOOP OUTPUT: HEATING LOOP OUTPUT | COOLING UNITS | HEATING UNITS |
|---|---|---|
| 100 : 1 | 6 | 0 |
| 66 : 1 | 5 | 1 |
| 33 : 1 | 4 | 2 |
| 1 : 1 | 3 | 3 |
| 1 : 33 | 2 | 4 |
| 1 : 66 | 1 | 5 |
| 1 : 100 | 0 | 6 |

HVAC SYSTEM FOR INDOOR AGRICULTURE

CROSS-REFERENCE TO RELATED APPLICATIONS

This application claims the benefit of U.S. Provisional Application No. 63/026,384 entitled "HVAC System for Indoor Agriculture" filed May 18, 2020, which is incorporated herein in its entirety by reference.

BACKGROUND

Technical Field

The present disclosure relates generally to heating, ventilation, and air conditioning (HVAC) systems, and in particular, to an HVAC system for indoor agricultural use.

Background of Related Art

Indoor agriculture is a challenging environment for HVAC systems. Energy densities can be very high, often exceeding those of server farms. Latent heat is almost completely absent at the start of a grow cycle, but just a few weeks later at the end of a grow cycle latent heat can be a substantial component of the total load. Moreover, different loads occur as the grow rooms shift between simulated daylight to darkness. Grow lights in particular present a heavy thermal load during the daytime cycle. Both temperature and relative humidity need to be independently controlled, and the right wet bulb/dry bulb combination changes from day to night cycle, across the growing life cycle of the plant, and is even variable between different strains of the same plant.

One known approach to control of temperature and humidity for indoor agriculture is the use of complex engineered chilled water systems. However, because of a combination of high initial engineering and installation costs, cultural, legal, and other economic factors, the use of complex chilled water systems has been unpopular in emerging agricultural markets such as cannabis and specialty gourmet crops.

Another known approach to control the temperature and humidity for indoor agriculture is the use of direct expansion (DX) systems with reheat. During the "day" cycle, grow room temperature and humidity must be strictly controlled. In day mode, the air can be chilled freely because the heat of the grow lights is typically sufficient to warm the room to the desired temperature. The "night" cycle presents challenges, however. Due to transpiration, latent cooling is needed at night to maintain relative humidity (RH) below problem levels. Should this fail to occur, mold growth can quickly destroy an entire crop. While a DX-only system is capable of removing moisture, during the night cycle insufficient heat is available to maintain the desired grow room temperature because the grow lights are shut off. To address this, reheat is used during night operation where the DX system dehumidifies with cooling, then heat is added back in order to deliver air that is sufficiently dry but not too cold. Such heat may be generated by resistance heating (RH), or derived from waste heat expelled from the DX condensing coil using methods such as hydronic reheat (HR) or hot gas reheat (HGR).

In a resistance heating (DX-RH) system, an electrical resistance heat element is positioned in the air downstream of the evaporator coil. While this method is low cost and reliable, it uses a great deal of electricity and is therefore very inefficient, and may be prohibited altogether by energy efficiency codes in some jurisdictions.

In a hydronic reheat system (DX-HR), hot water heated by a boiler or by heat expelled by a WSHP is used as a medium for reheating, while in a hot gas reheat system (DX-HGR), refrigerant is used as the medium. A reheat coil is installed downstream of the evaporator. This requires the installation of hydronic or refrigerant piping throughout the facility, considerably raising first cost, construction time, and system complexity. DX-HGR systems also have difficulty controlling temperature and humidity independently. In addition, because of suboptimal latent cooling ratios, DX-HGR systems typically need to be backed up by auxiliary dehumidification devices at the end of the grow cycle. DX-HGR is also a relatively niche product, with both long equipment lead times and little ability to be repurposed to other uses if the space is no longer used for indoor agriculture.

An HVAC system that addresses these shortcomings would be a welcome advance in the art.

SUMMARY

In one aspect, the present disclosure is directed to a method of conditioning the air of an indoor agricultural space. In an exemplary configuration, the method includes providing a plurality of water sourced heat pumps. Each of the each of the plurality of water source heat pumps is arranged to supply conditioned air to a common plenum. At least one of the plurality of water source heat pumps is operated in a cooling mode to provide dehumidification, and at least one of the plurality of water source heat pumps is operated in a heating mode to provide energy-efficient reheat. The conditioned air supplied by each of the plurality of water source heat pumps is mixed, and the mixed air is moved into the indoor agricultural space.

In some configurations, a centrifugal blower performs the mixing and/or the moving. The mixed air may be moved into the indoor agricultural space by way of an air distribution system. The method may include adjusting a property of the conditioned air supplied by at least one of the plurality of water source heat pumps. Adjusting a property may include adjusting an airflow rate and/or adjusting an airflow temperature of the conditioned air. The adjusting may be performed in accordance with a grow cycle schedule comprising at least one of a daytime humidity, a daytime temperature, a nighttime humidity, and a nighttime temperature. The grow cycle schedule may be based at least in part upon the current stage of the life cycle of a crop growing in the indoor agricultural space, and additionally or alternatively be based at least in part upon the strain of crop growing in the indoor agricultural space.

BRIEF DESCRIPTION OF THE DRAWINGS

Exemplary embodiments of the disclosed invention are described herein with reference to the drawings wherein.

Figure 1:
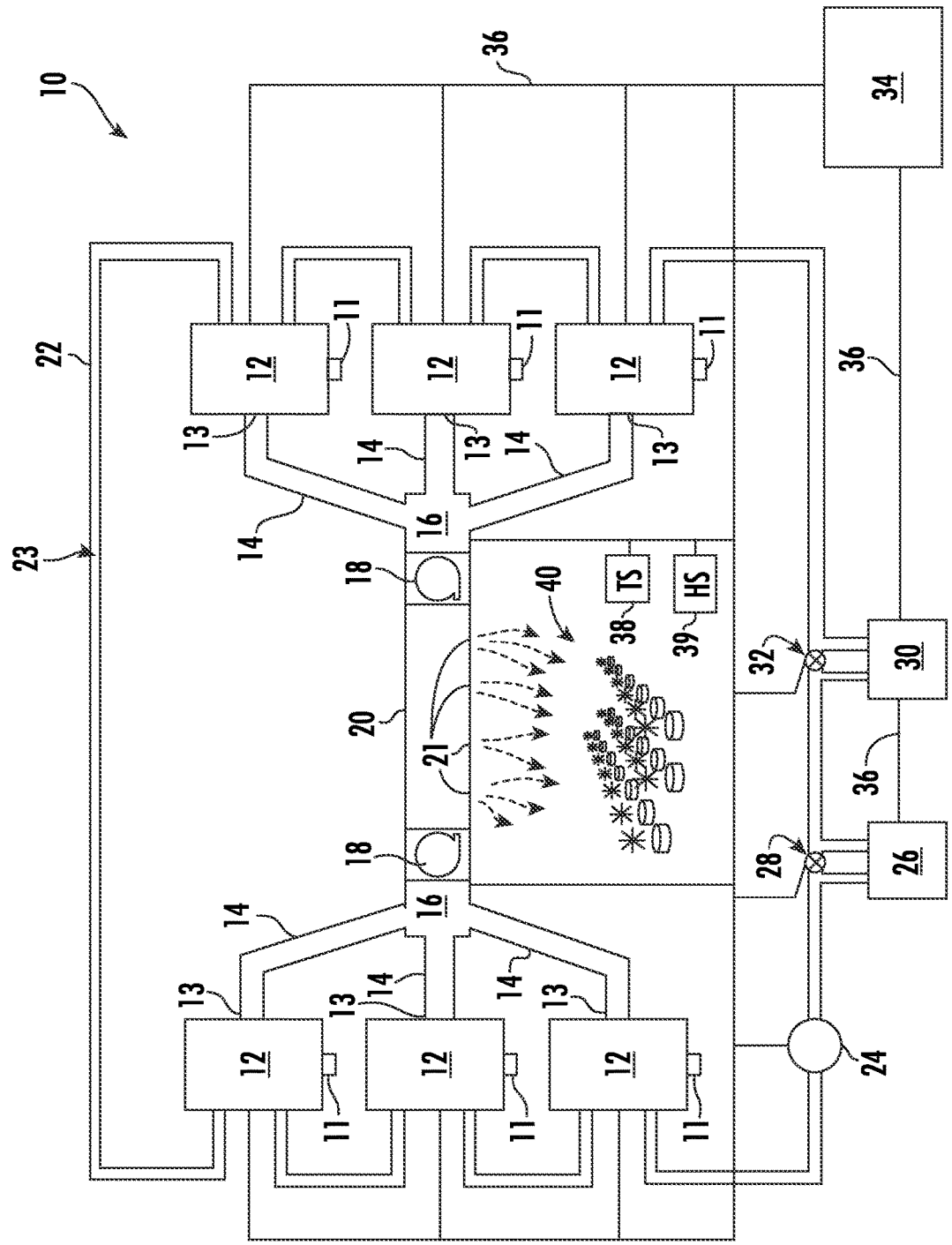
FIG. 1 is a schematic view of the disclosed water source heat pump system for indoor agriculture having dehumidification and reheat, according to some example implementations.

Aspects of the present disclosure mentioned above are described in further detail with reference to the aforementioned figures and the following detailed description of example configurations.

DETAILED DESCRIPTION

Particular examples of the present disclosure are described herein below with reference to the accompanying drawings, however, the disclosed invention may be embodied in various forms. Well-known functions or constructions, such as the fundamental operation of a vapor compression heat pump system, as well as repetitive matter, are not described in detail to avoid obscuring the present disclosure in unnecessary or redundant detail. Therefore, specific structural and functional details disclosed herein are not to be interpreted as limiting, but as a basis for the claims and examples for teaching the skilled artisan to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any configuration described herein as "exemplary" is not necessarily to be construed as preferred or advantageous over other configurations. The word "example" may be used interchangeably with the term "exemplary."

Aspects of the present disclosure may be described herein in terms of functional block components and various processing steps. It should be appreciated that such functional blocks configured to perform the specified functions may be embodied in machines, analog circuitry, digital circuitry, and/or modules embodied in a computer. For example, the present disclosure may employ various mechanical devices, electromechanical devices, discrete electronic components, integrated circuit components (e.g., compressors, blowers, processing elements such as microprocessors or microcontrollers, memory elements, logic elements, look-up tables, and the like) which may carry out a variety of functions, whether independently, in cooperation with one or more other components, and/or under the control of one or more processors or other control devices. The express disclosure of a component (e.g., compressors, blowers, processor, memory, driver, interface, etc.) used in one element should not be construed to exclude the use of a similar component that may not be expressly disclosed in another element. One skilled in the art will also appreciate that, for security reasons, any element of the present disclosure may include any of various suitable security features, such as firewalls, access codes, passwords, authentication, encryption, de-encryption, compression, decompression, and/or the like. It should be understood that the steps recited herein may be executed in any order and are not limited to the order presented. Moreover, two or more steps or actions recited herein may be performed concurrently Water Source Heat Pumps (WSHPs) offer an effective way to deal with the environmental needs of indoor agriculture. The WSHP is mass produced, readily available, and very well positioned for repurposing if another use is needed for the building in the future. When designed with a large evaporator coil and a low speed or variable speed fan, WSHPs can also demonstrate very good dehumidification performance, with impressive latent heat ratios.

A water loop through the facility provides a heat transfer medium to the WSHPs and employs a cooling tower and/or boiler. This allows the heat to be rejected to water, a much more efficient approach than rejecting heat to air. Not only does this significant efficiency increase yield a benefit to operators in the form of reduced operating costs, it may also have benefits from a policy standpoint. Utilities might soon discover indoor agriculture facilities using the disclosed WSHP system place less stress on distribution grids than facilities using DX-HGR units, which in turn could lead to generous incentives for WSHPs installations.

The ability to use multiple smaller units in a grow room means that a design using WSHPs has an inherent level of redundancy compared to DX-HGR designs, which are typically one unit per room.

Turning now to FIG. 1, an exemplary system 10 for conditioning the air of an indoor agricultural space 40 ("grow room") is shown. System 10 includes a plurality of water source heat pumps (WSHPs) 12. A water loop 22 circulates a liquid heat transfer medium 23, such as without limitation, water or a water/anti-freeze mix, to the plurality of WSHPs 12. Each WSHP 12 is a self-contained unit, or, alternatively, a system having multiple refrigerant loops ganged together in a single machine. WSHP 12 includes a vapor compression refrigeration system that transfers heat between a first heat exchange coil and a second heat exchange coil. WSHP 12 may be operated bidirectionally, depending on whether cooling or heating is desired. In cooling mode, heat is absorbed from grow room air flowing through the first heat exchange coil and released into transfer medium 23 flowing through the second heat exchange coil, which cools and/or dehumidifies grow room air. In heating mode, the cycle is reversed: heat is absorbed from liquid transfer medium 23 flowing through the second heat exchange coil, and released into grow room air flowing through the first heat exchange coil to warm or "reheat" grow room air. The design and operation of an exemplary WSHP is disclosed in more detail in commonly-owned U.S.

Pat. No. 6,321,558 entitled "Water Source Heat Pump With Hot Gas Reheat," the entirety of which is hereby incorporated by reference herein for all purposes.

WSHP 12 receives air from the grow room 40 from a return duct 11 and delivers conditioned air (whether cooled or heated, as discussed below) from a discharge outlet 13. Each discharge outlet 13 is coupled to duct 14 which channels conditioned air from WSHP 12 to a mixing plenum 16. The example configuration shown in FIG. 1 illustrates two banks of three WHSPs where each bank is associated with a mixing plenum 16, however, the disclosed system may include variants with one bank or three or more banks of WSHPs, with a plurality of WSHPs in each bank.

The mixing plenums 16 terminate at the inlet of an air mover 18. Air mover 18 is preferably a single speed, dual speed, or variable speed centrifugal blower. However, other types of air movers, such as without limitation a bladed fan may be additionally or alternatively employed. Air mover 18 fulfills several purposes, one being to thoroughly mix the conditioned air received from the WSHPs feeding the associated combining plenum such that the air entering the distribution system 20 is well-mixed. Another is to further pressurize the air as it enters the air distribution system 20 to facilitate delivery of the mixed air to the grow room via one or more air registers 21. Yet another purpose is the air mover, in conjunction with a speed control of the blowers on the individual units 12, air mover 18 allows variable air flow across the coils of the individual units 12 by being variable itself. As shown in FIG. 1, the WSHPs may be arranged to feed into both ends of a distribution system 20, one end, or any other desired configuration that meets site requirements.

A circulating pump 24 moves the liquid medium through water loop 22. Liquid medium 23 flowing from WSHPs 12 may flow through heating unit 26 and/or cooling unit 30 to move thermal energy into, or out of, liquid medium 23. Heating unit 26 may be a furnace. Cooling unit 30 may include, without limitation, a chiller, adiabatic cooler, dry cooler, cooling tower, ground loop, or any other form of heat rejection equipment that allows heat to be removed from liquid medium 23. A bypass valve 28 associated with heating unit 26 is provided to selectively allow the full flow of liquid medium 23 to flow through heating unit 26, a portion of liquid medium 23 to flow through heating unit 26 and a portion thereof to bypass heating unit 26, or to allow all liquid medium 23 to bypass heating unit 26. Similarly, a bypass valve 32 associated with cooling unit 30 is provided to selectively allow the full flow of liquid medium 23 to flow through cooling unit 30, a portion of liquid medium 23 to flow through cooling unit 30 and a portion to bypass cooling unit 30, or to allow all liquid medium 23 to bypass cooling unit 30. Heating unit 26 and/or cooling unit 30 may be activated as needed to maintain the transfer medium within the necessary temperature range to ensure efficient operation of WSHPs 12.

In some examples, the conditioned air is circulated in a closed path between the air handling unit(s) and the indoor agricultural space. In these examples, the path of the circulating conditioned air may be separated and closed off from an outdoor environment such that little to no outside air is mixed with the circulating conditioned air. In these examples, the system may not include any registers, louvers, ducted connection, or other form of fluid communication between an outdoor environment and the circulating conditioned air. In some examples, the system includes features such as dampers, which may selectively close the circulating path and create a closed system. In some of these examples, the supply air and/or the return air are ducted. In these examples, air may be circulated within a closed loop flowing from the air handling unit to a supply duct network, then to an indoor agricultural space, and then to a return air duct work that routes the air directly back to the air handler unit.

In some of examples, the system includes two or more circulation paths, each of which may be separate from each other and/or closed paths. In these examples, two or more sets of air handling units may each supply conditioned air to one or more grow rooms within an indoor environment. In these examples, one set of plurality of air handling units may supply air to one or more grow rooms, potentially via a common plenum. Another set of plurality of air handling units may supply air to another grow room(s), potentially via a separate common plenum. In these examples, each set of air handling units may have an independent supply air path, which directs the conditioned supply air to the one or more grow rooms associated with that set of air handling units. These sets of air handling units may also include independent return air paths that ensure the return air from the sets of handling units are also not mixed. The independent air paths may be duct, utilized different plenums, or separated in another way. In some examples, only the supply or the return air paths are independent.

Figure 2:
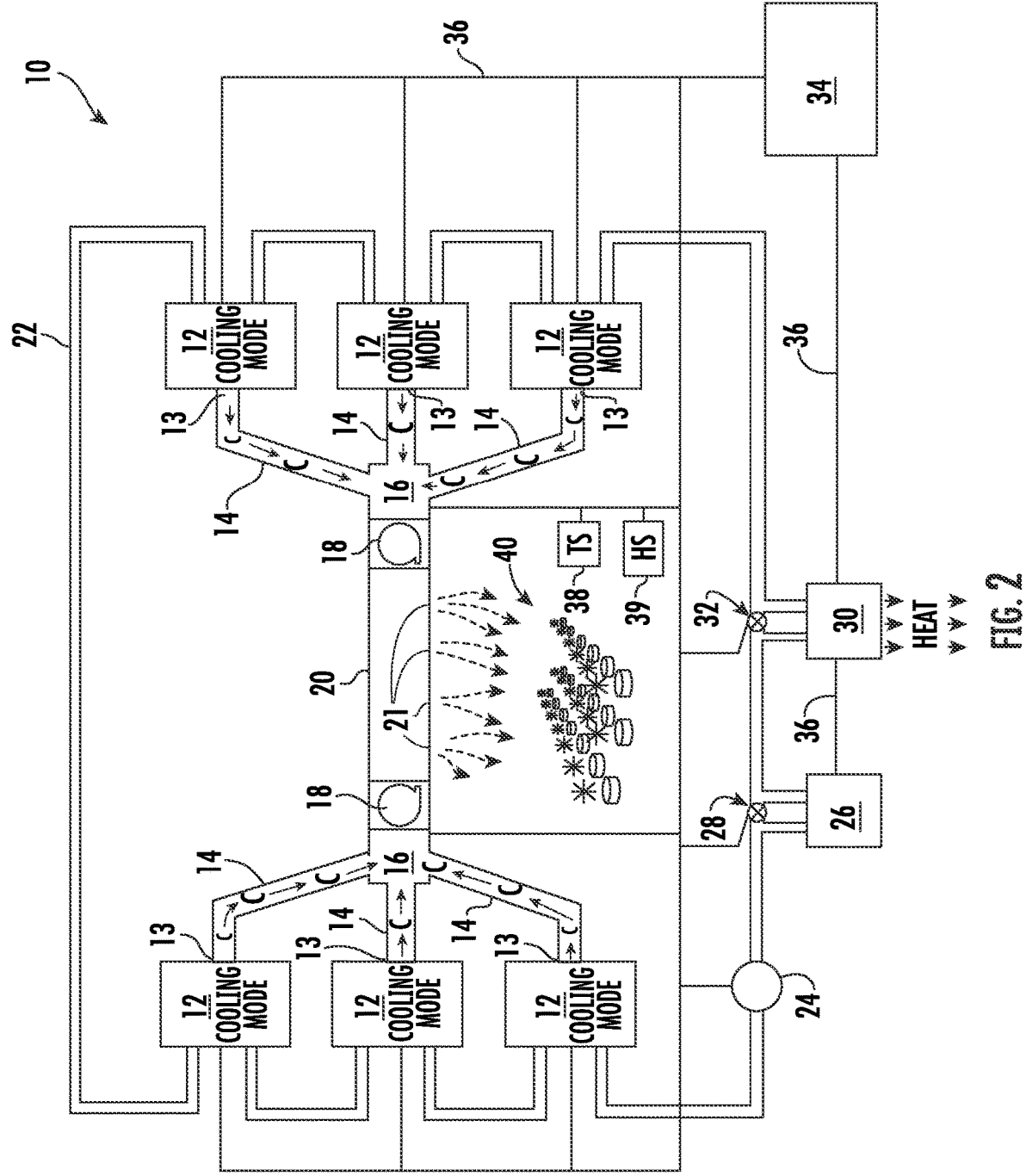
FIG. 2 is the system of FIG. 1 operating in day mode, according to some example implementations.

Turning to FIG. 2, during "daytime" use, e.g., when grow lights are activated, WSHPs 12 use liquid medium supplied by the condensing water loop 22 as a condensing medium, warming the water in the process. The WSHPs 12 are in cooling mode to supply conditioned (e.g., cooled and dehumidified) air to the plenum 16, where it is mixed further pressurized by air mover 18 and supplied to air distribution system 20. An advantage of the disclosed system is that the multiple WSHPs 12 feeding into a common air distribution system 20 can be staged. By selectively turning individual WSHPs in the bank on or off, the amount of cooling provided can be modulated. Another advantage of the disclosed system is that some WSHPs in a bank may be single- or dual-speed units while other WSHPs in a bank may be variable-speed units. This enables precise staging where single- or dual-speed WSHPs are activated to provide gross modulation of output and one or more variable-speed WSHPs are used to provide fine adjustments of output. In this manner, very precise control of grow room conditions is maintained. The room may or may not need reheat in the day cycle, depending upon latent heat load and sensible heat load in the space. Waste heat may be used for reheat purposes, or, expelled to the outside environment by cooling unit 30 if reheat is not needed.

Figure 3:
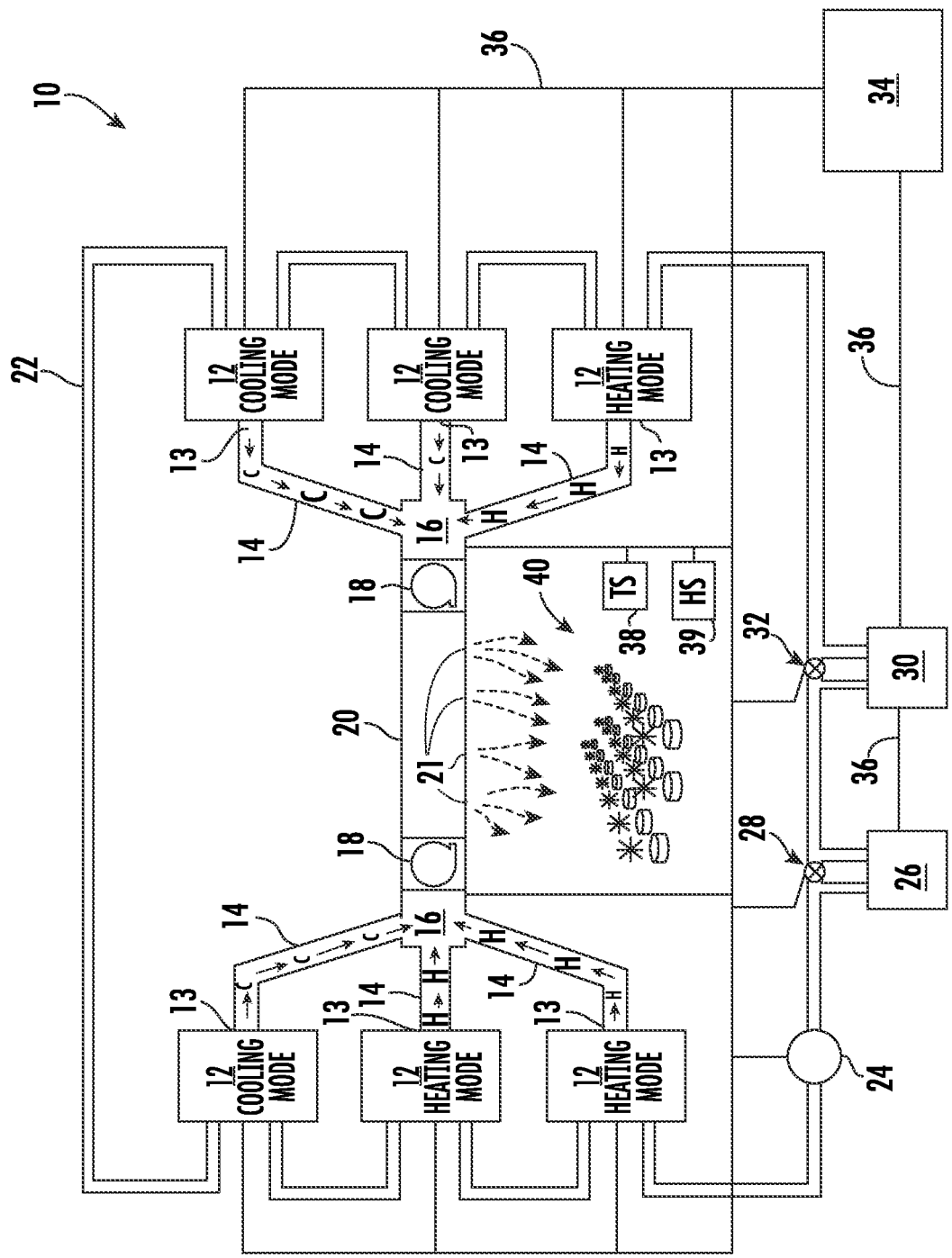
FIG. 3 is the system of FIG. 1 operating in night mode, according to some example implementations.

In FIG. 3, during "night" operation, e.g., when the grow lights are off, dehumidification with reheat will be required to maintain the desired environmental conditions in grow room 40. To achieve this, a subset (one or more) of WSHPs 12 are operated in cooling/dehumidification mode where they absorb heat from return air received from grow room 40 and reject this heat into water loop 22, thus cooling the air. The conditioned/cooled air is then supplied to plenum 16, mixed with conditioned air from other WSHPs in the bank, and delivered to grow room 40. Note that, since the total heat load in the space is much lower during night cycle operation, some WSHPs 12 may be in the off state, but are available for use if needed.

Continuing in night mode, a different subset of WSHPs 12 are operated in heating mode, which is essentially reverse operation from cooling mode. In heating mode, one or more WSHPs 12*s* absorb heat from water loop 22 and reject this heat into air received from grow room 40, thus heating the air. The heated air is then supplied to plenum 16, mixed with conditioned air from other WSHPs in the bank, and delivered to grow room 40.

The heating mode WSHPs fulfill the necessary reheat function to bring the delivered air temperature up to the required level. By using the heat rejected into water loop 22 by the cooling WSHPs 12, the heating WSHPs 12 are much more efficient than an electric reheat element, and substantially lower in cost than a hydronic reheat system, while still allowing independent control of both dry bulb and wet bulb temperatures. The air exiting all operating WSHPs 12 flows into plenum 16 where it is mixed and pressurized by air mover 18 as described above. In this manner, only well-mixed, dry, and appropriate-temperature air is supplied to the air distribution system 20 for delivery to the grow room.

A controller 34 receives temperature and humidity data from one or more temperature sensors 38 and humidity sensors 39 situated in grow room 40 and adjusts operation of system 10 to achieve the desired environmental conditions in grow room 40. Controller 34 is in operative communication with components of system 10 via a communications link 36, which may include hard wired and/or wireless links (e.g., Zigbee), and may employ point to point or bus/network communications techniques such as, without limitation, BACnet. In some examples, the system includes additional sensors that may be directed to indoor agriculture. These sensors may include carbon dioxide ($CO_2$) sensors and/or oxygen ($O_2$) sensors. These sensors may be used to provide an indication of the grow cycle of a given crop, and/or whether the conditions are appropriate for the crop or potential occupants. The controller may provide an alarm if the conditions are determined to be in adequate, or adjust the conditioning schedule for one or more grow rooms.

An indoor agricultural facility may include two separate grow rooms that are scheduled to operate in opposite modes, e.g., when room A is in day mode room B is in night mode, and vice versa. A loop interconnect is provided to allow liquid medium to selectively flow between the water loops of room A and room B. In this configuration, efficiency is greatly increased since waste heat from one room is transferred to the other room and used for reheat, rather than expelled into the outside environment and lost. An indoor agricultural facility may include three or more separate grow rooms. The water loop of each room is coupled to a common distribution manifold that enables the waste heat of any one room to be intelligently routed to one or more of the other rooms that have a WSHP operating in heating mode. This arrangement can allow the individual rooms to operate in a round-robin fashion to more effectively manage aggregate site load over a 24-hour period, for example, to take advantage of off-peak pricing and demand-response events. This technique also helps to lessen the impact of demand-response events on the circadian grow cycle of sensitive crops by distributing the load reduction across those grow rooms requiring heat that can take advantage of waste heat from other grow rooms expelling excess heat.

As discussed above, in some examples, a grow cycle schedule may be associated with the indoor facility and/or the grow rooms. The grow cycle schedule may be based, at least in part, on the crop(s) within the space. These crops may require or prefer various environment conditions, such as temperature, humidity, light (potentially both time and intensity), or other factors, and these preferences may change over time. For example, at the planning stage, the crops may require certain conditions as far as humidity and temperature. Weeks later the preferences of the same crops may change as they develop and grow. These requirements may also change depending on the life cycle of the crop(s), the type of crop, or even the crop strain.

The grow cycle schedule may account for the conditioning needs and changes associated with these crops. For example, the grow cycle schedule may include a daytime humidity, a daytime temperature, a nighttime humidity, and/or a nighttime temperature. The daytime humidity level may be a setpoint, an upper maximum, and/or a lower minimum of humidity for the crop(s) while the grow room is in a daytime mode. Similarly, the daytime temperature may be a desired setpoint, an upper maximum, and/or a lower minimum of temperature for the crop(s) while the grow room is in a daytime mode. The nighttime humidity and temperature setting may have corresponding values for the nighttime hours. The air handing unit(s) may adjust the heating or cooling provided based on these values. For example, these air handling units may adjust a property of the conditioned supply air such as the airflow rate or the airflow temperature.

The grow cycle schedule may set or adjust the values associated with these settings. For example, the grow cycle schedule may set one or more of these values based on the life cycle stage of the crop(s) within the grow room or indoor space. The grow cycle schedule may also set these values based on the strain of crop(s) within the grow room or indoor space. In some examples, the grow cycle schedule varies these values based on as the life cycle stage of the crop(s) changes. In some examples, the grow cycle schedule is designed to mirror the outdoor environment in which the crop(s) grow. In some examples, the grow cycle schedule set to maximize a given property within the crop(s) such as quantity or potency of a given crop component. In some examples, the grow cycle schedule varies the duration of the daytime and nighttime settings. In some examples, the day and nighttime settings correspond to more or less than a 24 hour schedule.

In some examples, two or more grow cycle schedules may be used. Each of these grow cycle schedules may be associated with one or more grow rooms. As discussed above, these grow cycle schedules may be coordinated such that two or more schedules are on opposite scheduled, e.g., one room is schedule for a nighttime mode and the other is schedule for a daytime mode. In other examples, the schedules are coordinated in a round robin fashion, again to facility distributing the number of grow rooms in different modes. Other configurations may also be used.

Figure 4:
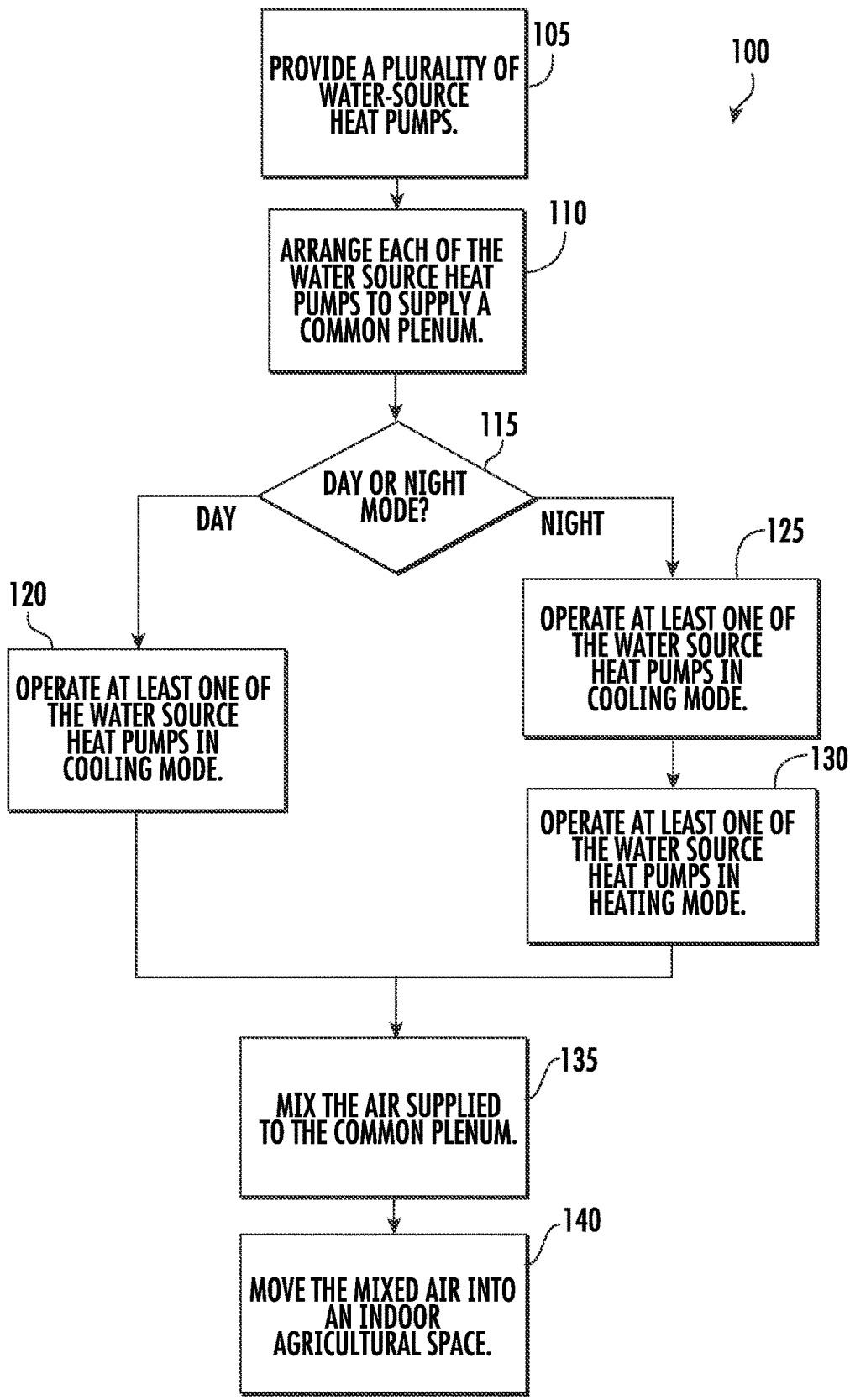
FIG. 4 is a flowchart describing the operation of a water source heat pump system for indoor agriculture having dehumidification and reheat in accordance with the some example implementations.

Turning now to FIG. 4, a method 100 of operating a water source heat pump system for conditioning the air of an indoor agricultural space is shown. In block 105 a plurality of water source heat pumps is provided. In block 110 each of the water source heat pumps is arranged to supply conditioned air to a common plenum. In block 115 the operating state is evaluated. If operating in day mode, block 120 is performed wherein at least one of the water source heat pumps is operated in cooling mode. If operating in night mode, blocks 125 and 130 are performed wherein at least one of the water source heat pumps is operated in cooling mode (block 125) and at least one of the water source heat pumps is operated in heating mode (block 130).

In block 135, the air supplied to the common plenum by the operating heat pumps is mixed, and in block 140 the mixed air is delivered to the indoor agricultural space.

Figure 5A:
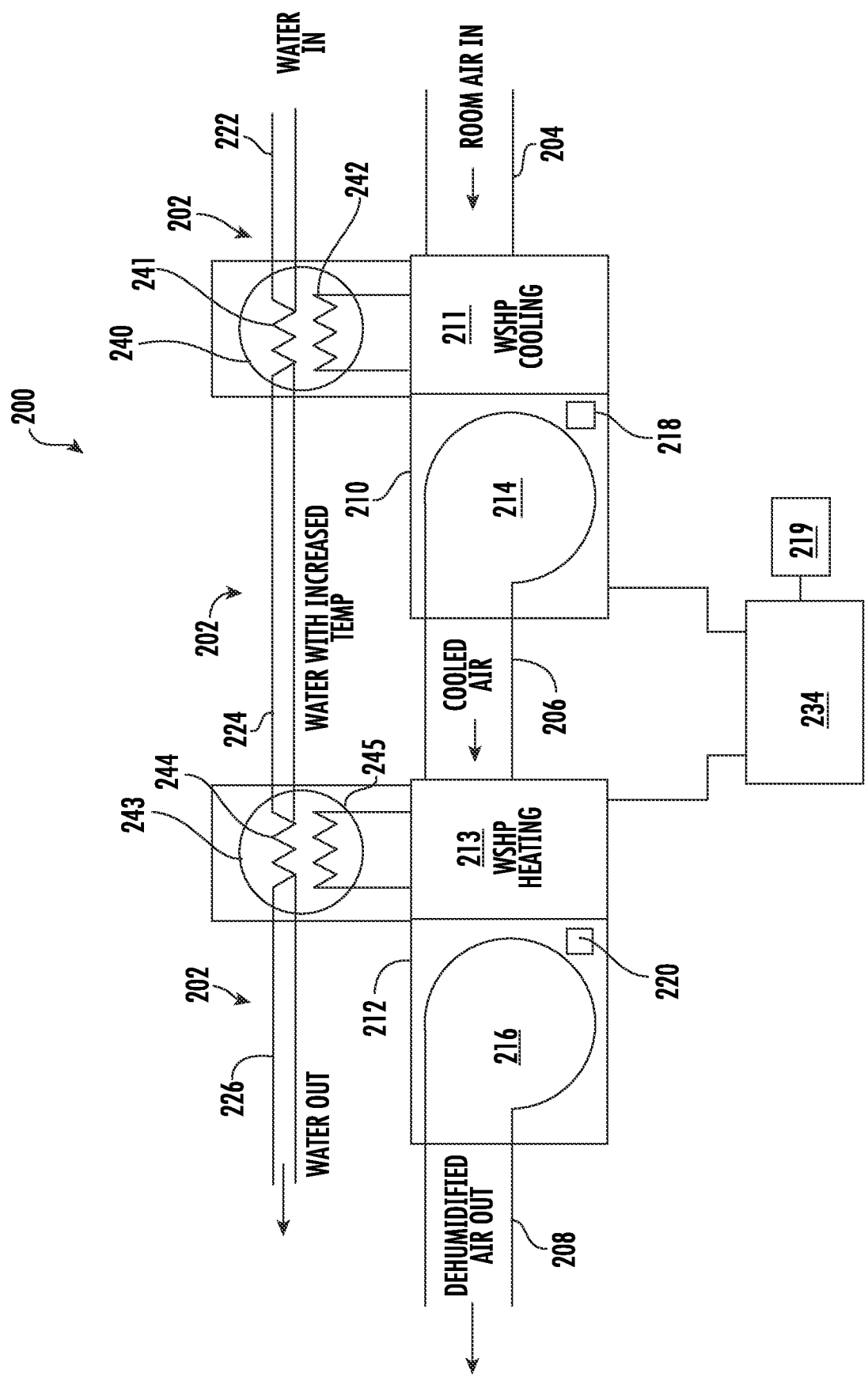
FIG. 5a illustrates a water source heat pump system having a plurality of water source heat pumps arranged in series operating in a dehumidification mode, according to some example implementations.

Turning to FIG. 5a, another example embodiment of a water sourced heat pump system 200 is shown wherein a pair of water source heat pumps consisting of first WSHP 210 and second WSHP 212 are arranged in a serial configuration. One or more such pairs may be utilized in a single grow room to provide the necessary volume of conditioned air for the room. Each pair of serially-arranged WSHPs 210, 212 may be operated in one of several operating modes. Preferably, first WSHP 210 operates in a cooling or dehumidification mode and second WSHP 212 operates in a heating mode. Air is circulated through WSHPs 210 and 212 by air mover 214, air mover 216 or both air mover 214 and air mover 216. Return air from the grow room enters WSHP 210 via return duct 204 and passed through heat exchanger 211. Water loop 202 supplies cold water to a water coil 241 via water line 222. As air is drawn through heat exchanger 211 by air mover 214, heat from the room air is transferred by vapor compression cycle from heat exchanger 211 into refrigerant coil 242. The transferred heat is rejected by heat exchanger 240 from refrigerant coil 242 into water coil 241. As coolant in water loop 222 flows through heat exchanger 240, the heat of the air flowing through WSHP 210 decreases and the heat of water exiting heat exchanger 240 increases. Dew point temperature sensor 218 positioned immediately downstream of heat exchanger 211 senses the temperature of cooled air exiting heat exchanger 211. Heated water expelled from heat exchanger 211 flows through water line 224.

Cooled air expelled by air mover 214 is channeled through coupling duct 206 and enters second WHSP 212 and passes through heat exchanger 213. Water loop 202 supplies water with increased temperature to water coil 244 of heat exchanger 243 via water line 224, transferring heat from water line 224 into refrigerant loop 245 by vapor compression cycle. Heated refrigerant flows through the coils of heat exchanger 213, rejecting heat from the refrigerant into the cooled air is drawn through heat exchanger 213 by air mover 216, which increases the air temperature. Dry bulb temperature sensor 220 positioned immediately downstream of heat exchanger 213 senses the temperature of heated air exiting heat exchanger 213. Heated water expelled from heat exchanger 213 flows through water line 226 into water loop 202. In some examples, only a subset of components associates with the second WHSP are used to heat the air. For example, only a heater coil may be used.

A system controller 234 is provided in operative communication with first WHSP 210 and second WHSP 212. System controller 234 adjusts the operation of WHSP 210 and second WHSP 212. One or more environmental sensors 219 are situated within the grow room to provide temperature and humidity data to system controller 234. System controller 234 receives dew point temperature data from dew point temperature sensor 218, and receives dry bulb temperature data from dry bulb temperature sensor 220.

Advantageously, second WHSP 212 can provide greater heat than that which was rejected by first WHSP 210 if dehumidification and sensible heating is required.

Dehumidification modulation may be accomplished by a combination of adjusting refrigerant flowrate of individual first WHSPs 210 and/or activating or deactivating additional individual first WHSPs 210. Heating modulation may be accomplished by a combination of adjusting refrigerant flowrate of individual second WHSPs 212s and/or activating or deactivating additional second WHSPs 212.

Figure 5B:
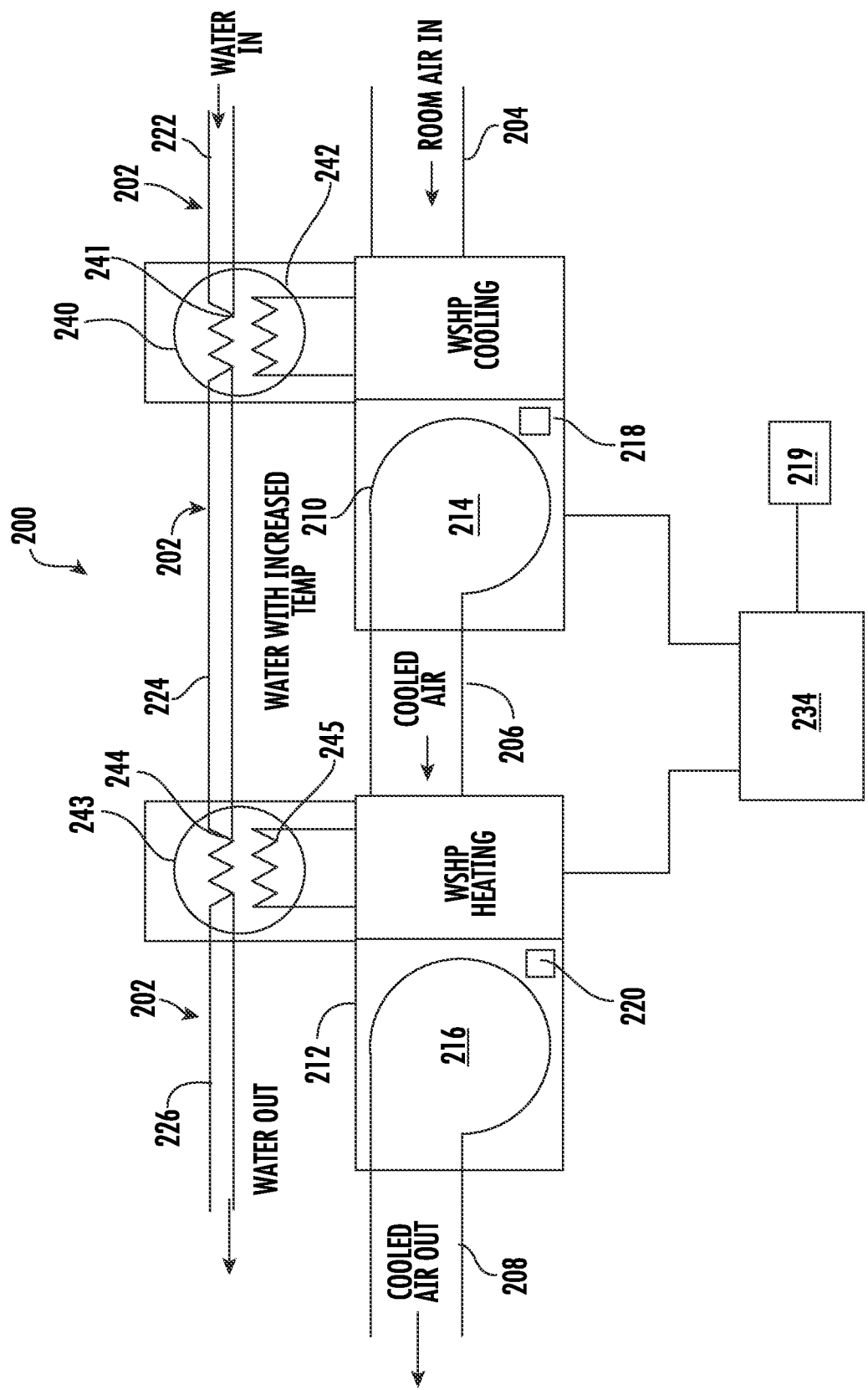
FIG. 5b illustrates the FIG. 5a configuration operating in a cooling mode, according to some example implementations.

FIG. 5b illustrates the water sourced heat pump system 200 operating in a cooling-only mode. In this mode, second WSHP 212 vapor compression cycle is deactivated, effectively operating in a passthrough or "fan-only" mode. Typically, air mover 216 will be activated while the vapor compression subsystem (e.g., the compressor) is deactivated to facilitate airflow though second WSHP 212 during cooling-only mode.

Figure 6A:
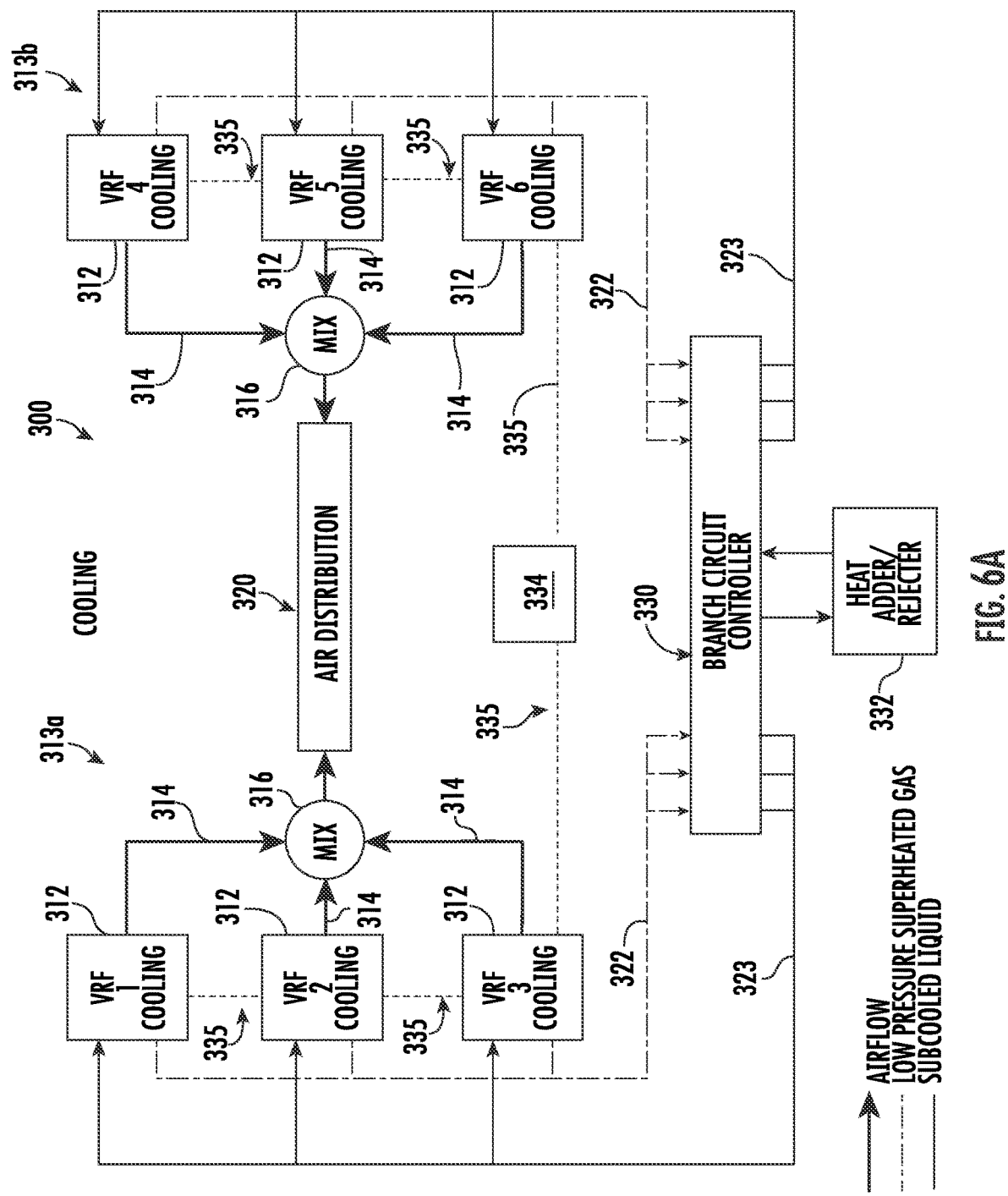
FIG. 6a illustrates a variable refrigerant flow (VRF) system having a plurality of VRF units arranged in parallel operating in a cooling mode, according to some example implementations.
Figure 6B:
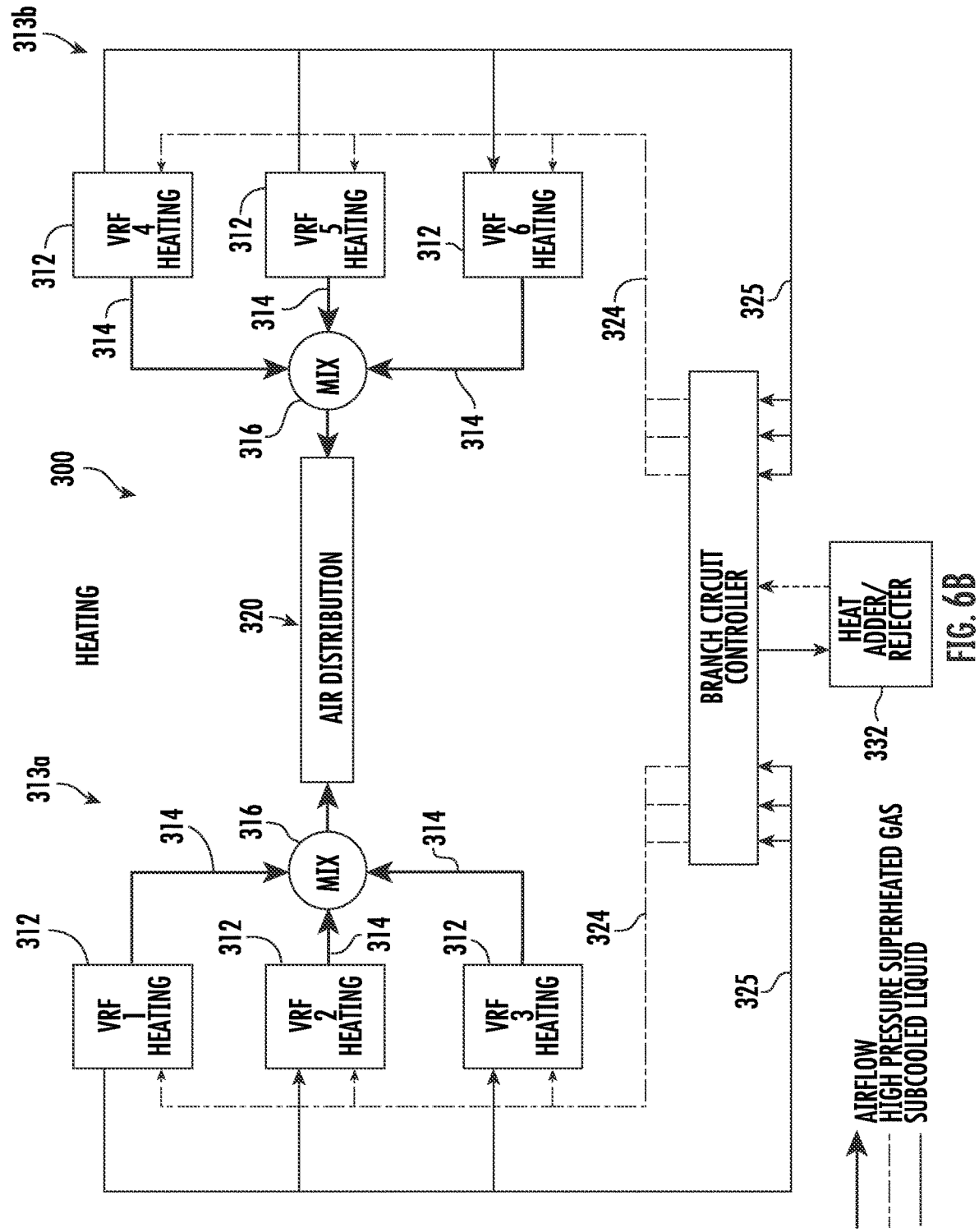
FIG. 6b illustrates the FIG. 6a configuration operating in a heating mode, according to some example implementations.
Figure 6C:
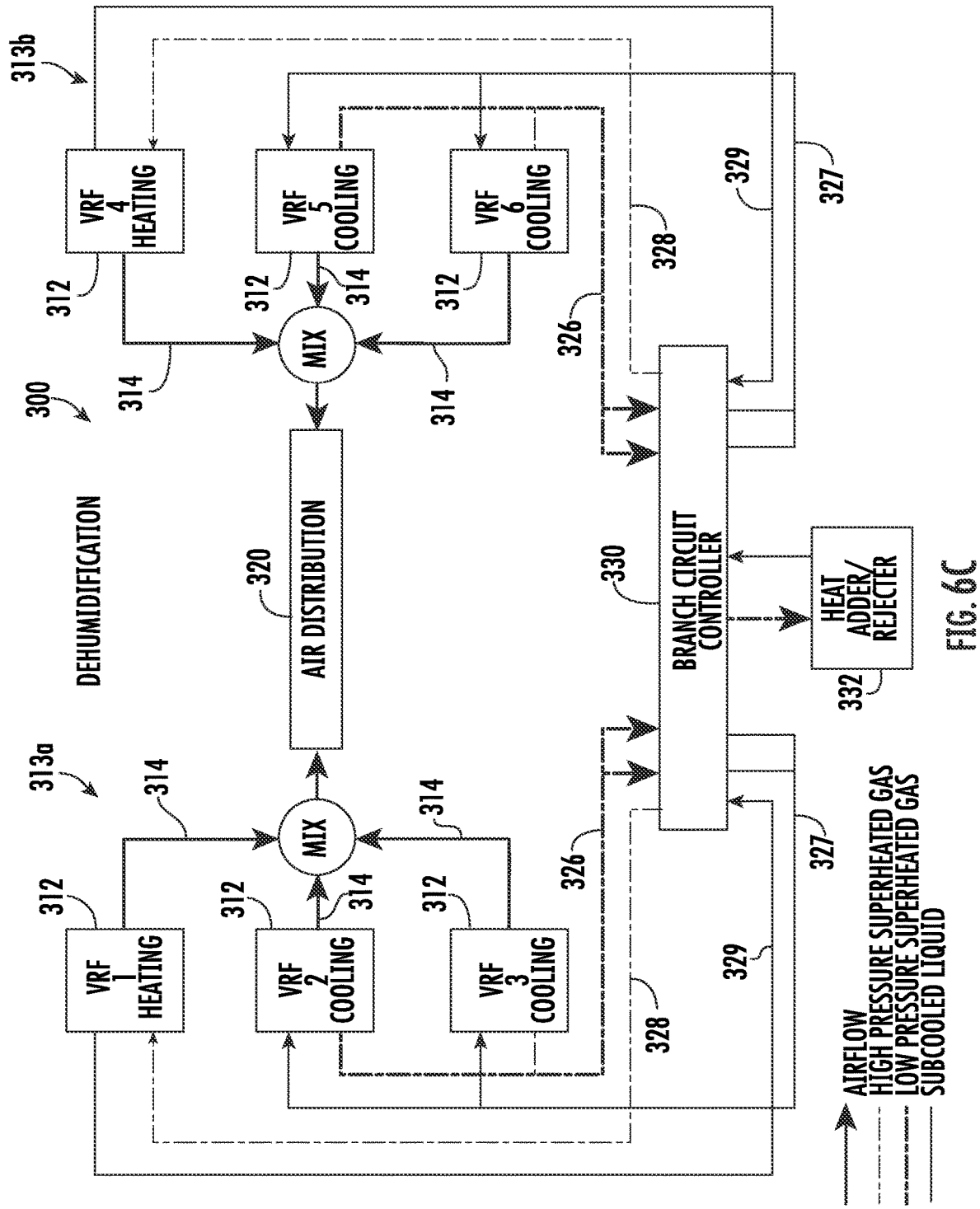
FIG. 6c illustrates the FIG. 6a configuration operating in a dehumidification mode, according to some example implementations.

Referring now to FIGS. 6a-6c, yet another exemplary system 300 for conditioning the air of an indoor grow room includes a plurality of variable refrigerant flow (VRF) units 312. In this example embodiment, six VRF units 312 are organized into two banks 313a and 313b, each bank consisting of three VRF units 312 arranged in a parallel configuration. The air output of each VRF unit 312 within a bank feeds a mixing plenum 316 that includes an air mover, as described above with respect to FIGS. 1-3. Mixed and conditioned air flows from mixing plenum 316 into common air distribution duct 320 for delivery into a conditioned grow room.

A branch circuit controller 330 determines the direction of refrigerant flowing between each VRF unit 312 and branch circuit controller 330, which enables each VRF unit 312 of system 300 to be selectively operated in a cooling mode, a heating mode, or an off mode. Branch circuit controller 330 may adjust the flow rate of refrigerant to each individual VRF unit 312 to modulate each unit's output. Additionally or alternatively, a VRF unit controller 344 coupled to VRFs 213 by a control bus 335 may modulate each unit's output by adjusting the speed of an air mover included within each VRF 312.

Branch circuit controller 330 additionally determines the routing of refrigerant to/from each VRF unit 312 and heat adder/rejecter 332. Heat adder/rejecter 332 is preferably situated outdoors and typically includes a compressor and heat exchanger to transfer heat between refrigerant and ambient outdoor air. Thus, for example, when system 300 is operating in a cooling mode as shown in FIG. 6a, refrigerant in low pressure superheated gas form flows from branch circuit controller 330 to heat adder/rejecter 332. Heat adder/rejecter 332, operating in a condensing mode, rejects heat from the refrigerant into the ambient outdoor environment and pressurizes the refrigerant into subcooled liquid form. The subcooled liquid 323 returns to branch circuit controller 330 and distributed to each VRF unit 312, which are operating in an evaporative mode, to absorb heat from room air to cool and dehumidify room air. The evaporated refrigerant, now again in low pressure superheated gas form, returns to branch circuit controller 330 and to heat adder/rejecter 332 to repeat the vapor compression cycle.

When system 300 is operating in a heating mode as shown in FIG. 6b, the cycle is reversed. Refrigerant in subcooled liquid form flows from branch circuit controller 330 to heat adder/rejecter 332, which is operated in an evaporating mode, absorbs heat from the ambient outdoor environment into the refrigerant which is pressurized into high pressure superheated form. The high pressure superheated refrigerant 325 returns to branch circuit controller 330 and distributed to each VRF unit 312, which are now operating in a condensing mode, to reject heat into room air to heat the room air. The condensed refrigerant, now again in subcooled liquid form, returns to branch circuit controller 330 and to heat adder/rejecter 332 to repeat the vapor compression cycle.

When system 300 is operating in a dehumidification mode, as shown in FIG. 6c, a combination cycle is used. In the example embodiment of FIG. 6c, two VRF units 312 are operated in heating mode (e.g., VRF 1 and VRF 4) while the remaining four VRF units 312 are operated in cooling mode (e.g., VRFs 2, 3, 5 and 6). Accordingly, branch circuit controller 330 distributes subcooled liquid 237 to cooling-mode VRF units (VRFs 2, 3, 5 and 6) and high pressure superheated gas 328 to heating mode VRF units (VRF 1 and VRF 4). From cooling-mode VRF units (VRFs 2, 3, 5 and 6), branch circuit controller 330 receives low pressure superheated gas 326 and from heating mode VRF units (VRF 1 and VRF 4) branch circuit controller 330 receives subcooled liquid 239.

In the present example, where the number of cooling mode VRF units 312 exceeds the number of heating mode VRF units 312, the system demand for subcooled liquid exceeds the demand for high pressure superheated gas. Under these conditions branch circuit controller 330 directs superheated gas to heat adder/rejecter which is operated in a condensing mode to reject heat from the refrigerant into the ambient outdoor environment and pressurize the refrigerant into subcooled liquid form.

Conversely, when the number of cooling mode VRF units 312 is less than the number of heating mode VRF units 312, the system demand for high pressure superheated gas exceeds the demand for subcooled liquid. Under these conditions branch circuit controller 330 directs subcooled liquid to heat adder/rejecter which is operated in an evaporating mode to absorb heat into the refrigerant from the ambient outdoor environment and provide to the system 300 high pressure superheated gas.

The number and operating speed of the water sourced heat pumps operating in cooling mode during day mode is determined in response to the current temperature and humidity sensed in the indoor agricultural space and the target daytime temperature and daytime humidity desired for the indoor agricultural space. The number and operating speed of the water sourced heat pumps operating in cooling mode during night mode, and the number and operating speed of the water sourced heat pumps operating in heating mode during night mode, is determined in response to the current temperature and humidity sensed in the indoor agricultural space and the target night temperature and night humidity desired for the indoor agricultural space.

Figures 7A, 7B:
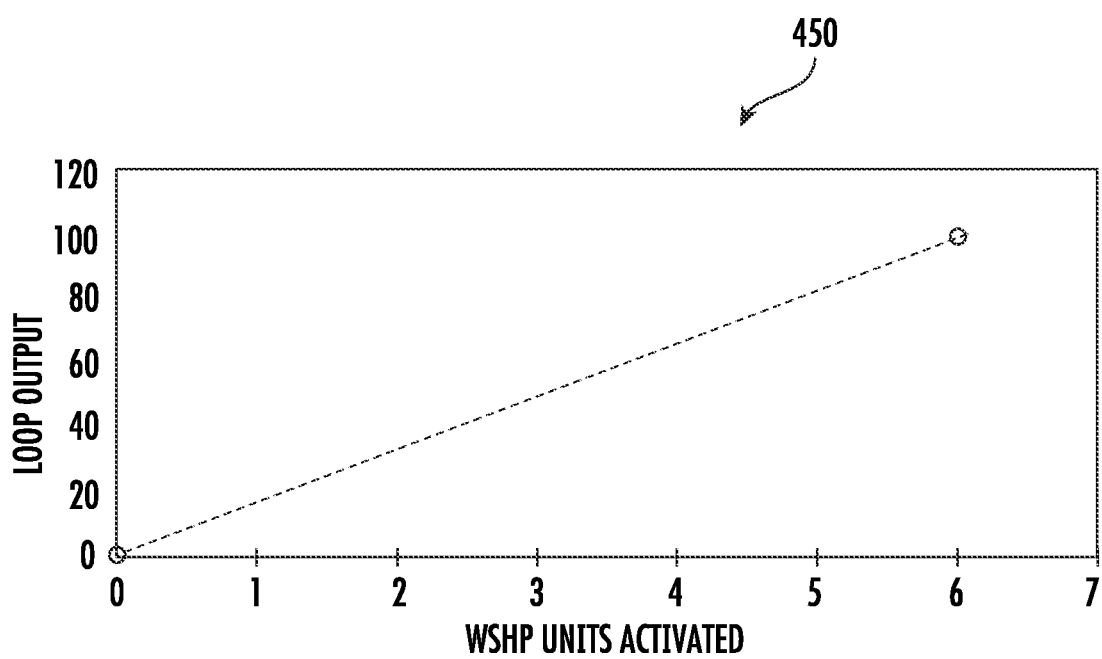
FIG. 7a is a chart illustrating an exemplary relationship between cooling loop:heating loop output ratio and number of activated cooling and heating units, according to some example implementations.
FIG. 7b is a graph illustrating an exemplary relationship between loop output and number of activated conditioning units, according to some example implementations.

FIGS. 7a and 7b illustrate a method of controlling a WHSP system suitable for indoor agriculture in accordance with another embodiment of the present disclosure. Three independent control loops determines the amount of latent cooling, sensible cooling, and heating that are required from the WSHP system. The maximum value from the latent and sensible cooling control loops is used to control cooling. Sensible cooling and heating control loops are used to control to the desired temperature setpoint. A latent cooling control loop will control to the space humidity setpoint.

The number of WSHPs in the cooling and heating modes, respectively, is determined by the ratio of the maximum cooling loop output to the heating loop output. When the cooling and heating loop outputs are equal, there will be an equal number of WSHPs set to the cooling mode and the heating mode. As more cooling is required, the system will transition some of the heating units to the cooling mode to satisfy space demands. If more heating is required, the system will transition some of the cooling units to the heating mode.

Consider an exemplary embodiment of the present disclosure wherein a WSHP system for indoor agriculture includes six WSHPs. FIG. 7a shows a table 400 that illustrates how the ratio between the cooling loop output (CLO) and heating loop output (HLO) determines the number of WSHP units operating in cooling mode and heating mode. For example, at 1:1 CLO:HLO ratio, an equal number of cooling units and heating units are activated, in this case, out of a total of six WSHPs, three are operated in cooling mode and three are operated in heating mode. As CLO:HLO moves towards cooling, the number of cooling units increases and the number of heating units decreases. In this example, at a 33:1 CLO:HLO four WSHPs are operated in cooling mode and two are in heating mode, and so forth as shown in FIG. 7a. Conversely, as CLO:HLO moves towards heating, the number of cooling units decreases and the number of heating units increases, for example, at 1:66 CLO:HLO one WSHP is operated in cooling mode and five are in heating mode, and so forth.

Referring now to FIG. 7b, the overall (total) amount of cooling or heating provided by the system is adjusted by selectively activating or deactivating WSHPs based on the required loop outputs as illustrated in graph 450. The system uses staging control based on loop outputs to determine how many units should be activated at a given time. As the cooling loop output increases, the number of cooling units turned on will increase. Likewise, as the cooling loop output decreases, the number of cooling units turned on will decrease. This same logic is used for the heating units. In this manner the amount of cooling and/or heating required to meet the desired CLO:HLO to satisfy grow room demand. The maximum number of units that can be activated in cooling or heating is determined by CLO:HLO. However, it is possible that operating the maximum number of units in either cooling or heating mode could exceed instant demand. In these instances less than the maximum number of WSHPs are activated. For example, if the required cooling loop output is 50%, and the heating loop output is 0%, the system sets all six WSHPs to cooling mode, but only three WSHPs are activated. Additionally, variable-speed WSHPs can be employed to provide infinitely-adjustable control of cooling loop and heating loop output. In this configuration each additionally activated (or deactivated) WSHP may be ramped up (or down) to increase control granularity and eliminate the large step in output that occurs when switching a single-speed WHSP on or off.

The present disclosure may be embodied as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python, or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
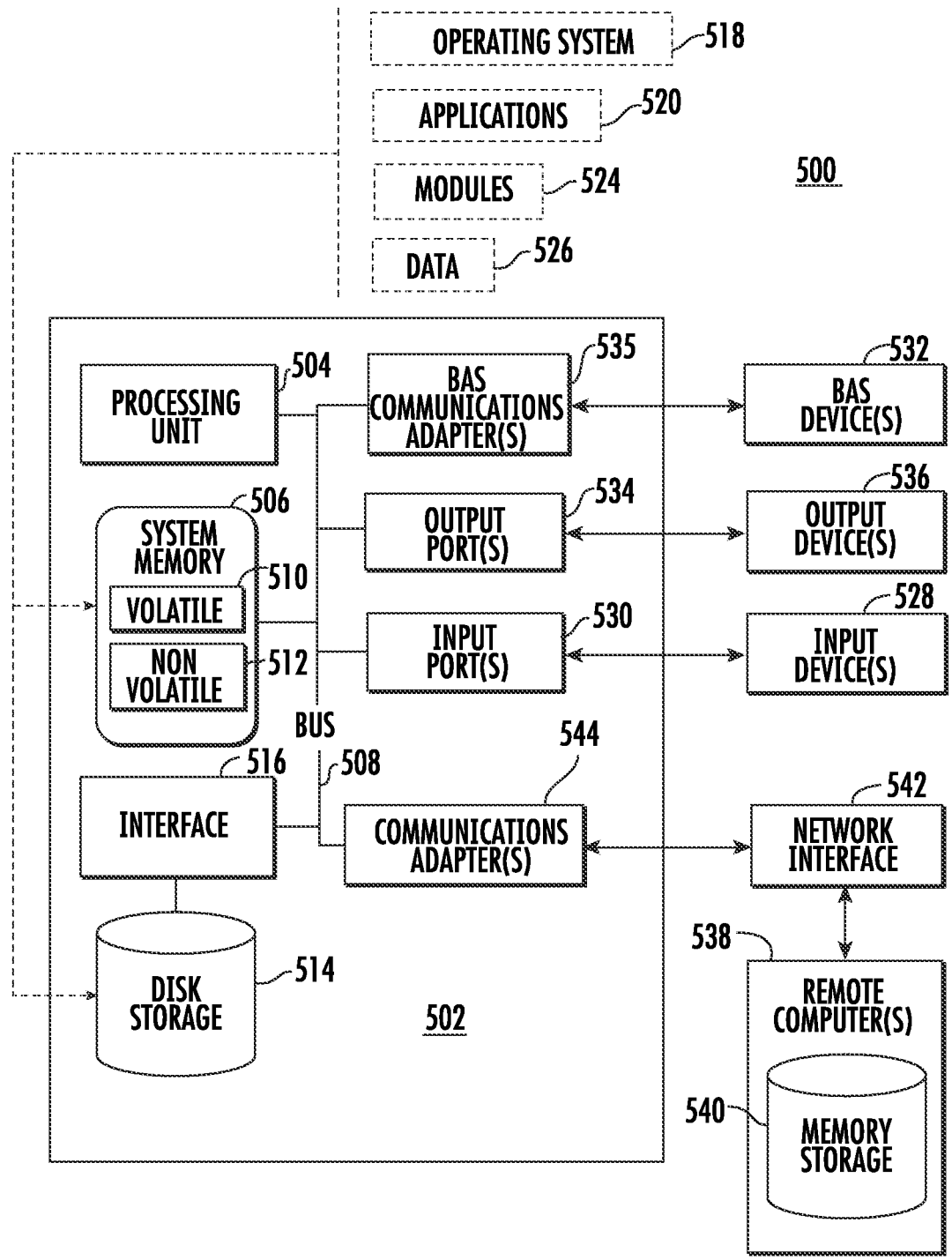
FIG. 8 illustrates a system controller for controlling the operation of a water source heat pump system for indoor agriculture having dehumidification and reheat, according to some example implementations.

With reference to FIG. 8, the systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

As shown in FIG. 8, an example environment 500 for implementing various aspects of the claimed subject matter includes a computer 502. The computer 502 includes a processing unit 504, a system memory 506, a building automation system (BAS) communications adapter 535, and a system bus 508. The system bus 508 couples system components including, but not limited to, the system memory 506 to the processing unit 504. The processing unit 504 can be any of various available processors such as an Intel Core™ processor, ARM Cortex A7 processor, and so forth. Dual microprocessors and other multiprocessor architectures also can be employed as the processing unit 504.

The system bus 508 can be any of several types of bus structure(s) including the memory bus or memory controller, a peripheral bus or external bus, or a local bus using any variety of available bus architectures or protocols including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI) Serial Peripheral Interface (SPI), inter-integrated circuit (I2C), embedded Multi-Media Controller (eMMC), Universal Synchronous/Asynchronous Receiver/Transmitter (USART), Secure Digital (SD) Double Data Rate Type 3 (DDR3), and Open NAND Flash interface (ONFI).

The system memory 506 includes volatile memory 510 and non-volatile memory 512, which can employ one or more of the disclosed memory architectures, in various embodiments. The basic input/output system (BIOS), containing the basic routines to transfer information between elements within the computer 502, such as during start-up, is stored in non-volatile memory 512. In addition, BAS communications adapter 535 can include at least one of an encoder or decoder, wherein the at least one of an encoder or decoder can consist of hardware, software, or a combination of hardware and software. Although BAS communications adapter 535 is depicted as a separate component, a portion of BAS communications adapter 535 can be contained within non-volatile memory 512. BAS communications adapter is configured to communicate with one or more BAS devices 532 using any one, some or all BAS communications protocols including without limitation BACnet, BACnet/IP, BACnet/IPv6, BACnet/MSTP, Point-To-Point over RS-232, Master-Slave/Token-Passing over RS-485, ZigBee, Z-Wave, and LonTalk. BAS devices 532 may include one or more WSHPs, temperature sensors, dampers, valves, furnaces, chillers, heat adder/rejecters, air movers, control panels, and the like as described herein.

By way of illustration, and not limitation, non-volatile memory 512 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 512 can employ one or more of the disclosed memory devices, in at least some embodiments. Moreover, non-volatile memory 512 can be computer memory (e.g., physically integrated with computer 502 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 510 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM) and so forth.

Computer 502 can also include removable/non-removable, volatile/non-volatile computer storage medium. FIG. 8 illustrates, for example, disk storage 514. Disk storage 514 includes, but is not limited to, devices like a magnetic disk drive, solid state disk (SSD), flash memory card, or memory stick. In addition, disk storage 514 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 508, a removable or non-removable interface is typically used, such as interface 516. It is appreciated that storage devices 514 can store information related to a user. Such information might be stored at or provided to a server or to an application running on a user device. In one embodiment, the user can be notified (e.g., by way of output device(s) 536) of the types of information that are stored to disk storage 514 or transmitted to the server or application. The user can be provided the opportunity to opt-in or opt-out of having such information collected or shared with the server or application (e.g., by way of input from input device(s) 528).

It should be appreciated that FIG. 8 describes software that can act as an intermediary between users and the basic computer resources described in the suitable operating environment 500. Such software includes an operating system 518. Operating system 518, which can be stored on disk storage 514, acts to control and allocate resources of the computer system 502. Applications 520 take advantage of the management of resources by operating system 518 through program modules 524, and program data 526, such as the boot/shutdown transaction table and the like, stored either in system memory 506 or on disk storage 514. It is to be appreciated that the claimed subject matter can be implemented with various operating systems or combinations of operating systems, for example and without limitation, Windows®, MacOS®, iOS®, Android®, and linux.

A user enters commands or information into the computer 502 through input device(s) 528. Input devices 528 include, but are not limited to, a resistive touch pad, capacitive touch pad, a pointing device such as a mouse, trackball, stylus, touch pad, keyboard, microphone, joystick, or game pad, and the like. These and other input devices connect to the processing unit 504 through the system bus 508 via interface port(s) 530. Interface port(s) 530 include, for example, a serial port, a parallel port, a game port, and a universal serial bus (USB) port. Output device(s) 536 can use some of the same type of ports as input device(s) 528. Thus, for example, a USB port can be used to provide input to computer 502 and to output information from computer 502 to an output device 536. Output adapter 534 is provided to illustrate that there are some output devices 536 like monitors, speakers, and printers, among other output devices 536, which require special adapters. The output adapters 534 include, by way of illustration and not limitation, video and sound cards that provide a means of connection between the output device 336 and the system bus 508. It should be noted that other devices or systems of devices provide both input and output capabilities such as remote computer(s) 538.

Computer 502 can operate in a networked environment using logical connections to one or more remote computers or devices, such as remote computer(s) 538. The remote computer(s) 538 can be a personal computer, a server, a router, a network PC, a workstation, a microprocessor-based appliance, a peer device, a smart phone, a tablet, or other network node, and typically includes many of the elements described relative to computer 502. For purposes of brevity, only a memory storage device 540 is illustrated with remote computer(s) 538. Remote computer(s) 538 is logically connected to computer 502 through a network interface 542 and then connected via communication connection(s) 544. Network interface 542 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Computer 502 can operate using the BACnet protocol, which defines a number of data link/physical layers, including ARCNET, Ethernet, BACnet/

IP, BACnet/IPv6, BACnet/MSTP, Point-To-Point over RS-232, Master-Slave/Token-Passing over RS-485, ZigBee, and LonTalk.

Communication connection(s) 544 refers to the hardware/software employed to connect the network interface 542 to the bus 508. While communication connection 544 is shown for illustrative clarity inside computer 502, it can also be external to computer 502. The hardware/software necessary for connection to the network interface 542 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

Clause 1. A method of conditioning air in an indoor agricultural space using a plurality of air handling units set up in an installation in which the plurality of air handling units supplies conditioned air to a common plenum, the method comprising: operating a first of the plurality of air handling units in a cooling mode; and as the first of the plurality of air handling units is operated in the cooling mode, operating a second of the plurality of air handling units in a heating mode; mixing the conditioned air supplied by the plurality of air handling units; and moving the conditioned air as mixed into the indoor agricultural space via the common plenum.

Clause 2. The method of clause 1, wherein the first of the plurality of air handling units and the second of the plurality of air handling units are operated in the installation to supply conditioned air to the common plenum in a parallel configuration.

Clause 3. The method of clause 1 or clause 2, wherein the first of the plurality of air handling units and the second of the plurality of air handling units are operated in the installation to supply conditioned air to the common plenum in a serial configuration.

Clause 4. The method of any of clauses 1 to 3, further comprising adjusting a property of the conditioned air supplied by at least one of the plurality of air handling units, and the property comprises an airflow rate or an airflow temperature of the conditioned air.

Clause 5. The method of clause 4, wherein the property of the conditioned air is adjusted in accordance with a grow cycle schedule comprising at least one of a daytime humidity, a daytime temperature, a nighttime humidity, or a nighttime temperature.

Clause 6. The method of clause 5, wherein the grow cycle schedule is based on a current life cycle stage of a crop growing in the indoor agricultural space.

Clause 7. The method of clause 5 or clause 6, wherein the grow cycle schedule is based on a strain of a crop growing in the indoor agricultural space.

Clause 8. The method of any of clauses 1 to 7, further comprising: establishing a ratio of a cooling loop output to a heating loop output to satisfy a demand of the indoor agricultural space; determining the maximum number of air handling units that may be operated in cooling mode and the maximum number of air handling units that may be operated in heating mode in accordance with the ratio of cooling loop output to heating loop output; and operating a first number of the plurality of air handling units in cooling mode that is equal to or less than the maximum number determined and operating a second number of the plurality of air handling units in heating mode that is equal to or less than the maximum number determined.

Clause 9. The method of clause 8, wherein the plurality of air handling units includes at least one variable speed water source heat pump, and the method further comprises: adjusting a speed of the at least one variable speed water source heat pump based on a cooling demand or a heating demand.

Clause 10. The method of any of clauses 1 to 9, further comprising: determining a number of the plurality of air handling units to operate in the cooling mode based on cooling demand; and operating the number of the plurality of air handling units in the cooling mode.

Clause 11. The method of any of clauses 1 to 10, further comprising: determining a number of the plurality of air handling units to operate in the heating mode based on heating demand; and operating the number of air handling units in the heating mode.

Clause 12. The method of any of clauses 1 to 11, wherein the plurality of air handling units are water sourced heat pumps, operating the first of the plurality of air handling units includes operating a first of the water sourced heat pumps, and operating the second of the plurality of air handling units includes operating a second of the water sourced heat pumps.

Clause 13. The method of any of clauses 1 to 12, wherein the plurality of air handling units are variable refrigerant flow air conditioning units, operating the first of the plurality of air handling units includes operating a first of the variable refrigerant flow air conditioning units, and operating the second of the plurality of air handling units includes operating a second of the variable refrigerant flow air conditioning units.

Clause 14. The method of any of clauses 1 to 13, further comprising utilizing a centrifugal blower to at least one of mix or move the conditioned air.

Clause 15. The method of any of clauses 1 to 14, wherein the installation includes an air distribution system, and moving the conditioned air comprises delivering the conditioned air as mixed into the indoor agricultural space by way of the air distribution system.

Clause 16. The method of any of clauses 1 to 15, wherein the installation includes a closed air path, and the method further comprises: circulating the conditioned air between the plurality of air handling units and the indoor agricultural space in the closed air path.

Clause 17. A method of conditioning air in an indoor agricultural space divided into grow rooms that are independent and distinct, using an installation with a first plurality of air handling units that supplies conditioned air to a first common plenum for a first of the grow rooms, and a second plurality of air handling units that supplies conditioned air to a second common plenum for a second of the grow rooms, the first common plenum and the second common plenum being separate and distinct from one another, the method comprising: operating first air handling units in respective ones of the first plurality of air handling units and the second plurality of air handling units in a cooling mode; and as the first air handling units are operated in the cooling mode, operating second air handling units in respective ones of the first plurality of air handling units and the second plurality of air handling units in a heating mode; mixing the conditioned air supplied by the first plurality of air handling units, and the conditioned air supplied by the second plurality of air handling units; and moving the conditioned air as mixed by the first plurality of air handling units to the first of the grow rooms via the first common plenum, and the conditioned air as mixed by the second plurality of air handling units to the second of the grow rooms via the second common plenum.

Clause 18. The method of clause 17, further comprising adjusting a property of the conditioned air supplied by at least one air handling unit in each of the first plurality of air handling units and the second plurality of air handling units, wherein the property of the conditioned air is adjusted in accordance with a grow cycle schedule comprising at least one of a daytime humidity, a daytime temperature, a nighttime humidity, or a nighttime temperature.

Clause 19. The method of clause 18, wherein the grow cycle schedule comprises a first grow cycle schedule and a second grow cycle schedule that are different from one another, and wherein adjusting the property includes adjusting the property the conditioned air supplied by the at least one air handling unit in the first plurality of air handling units according to the first grow cycle schedule, and adjusting the property of the conditioned air supplied by the at least one air handling unit in the second plurality of air handling units according to the second grow cycle schedule.

Clause 20. The method of any of clauses 17 to 19, wherein the first plurality of air handling units, and the second plurality of air handling units, are water source heat pumps connected to a common water loop.

Clause 21. A system for providing conditioned air to an indoor agricultural space, the system comprising: a plurality of air handling units, wherein the plurality of air handling units are arranged in an installation that supplies conditioned air to a common plenum; a blower fluidly coupled to the common plenum; and a controller operatively coupled to the plurality of air handling units and the blower, wherein the controller is configured to: operate a first of the plurality of air handling units in a cooling mode, and as the first of the plurality of air handling units is operated in the cooling mode, operate a second of the plurality of air handling units in a heating mode; wherein the blower is configured to: mix the conditioned air supplied by the plurality of the air handling units, and move the conditioned air as mixed into the indoor agricultural space via the common plenum.

Clause 22. The system of clause 21, wherein the first of the plurality of air handling units and the second of the plurality of air handling units are arranged to supply conditioned air to the common plenum in a parallel configuration.

Clause 23. The system of clause 21 or clause 22, wherein the first of the plurality of air handling units and the second of the plurality of air handling units are arranged to supply conditioned air to the common plenum in a serial configuration.

Clause 24. The system of any of clauses 21 to 23, wherein the controller is further configured to adjust a property of the conditioned air supplied by at least one of the plurality of air handling units, and the property comprises an airflow rate or an airflow temperature of the conditioned air.

Clause 25. The system of clause 24, wherein the property of the conditioned air is adjusted in accordance with a grow cycle schedule comprising at least one of a daytime humidity, a daytime temperature, a nighttime humidity, or a nighttime temperature.

Clause 26. The system of clause 25, wherein the grow cycle schedule is based on a current life cycle stage of a crop growing in the indoor agricultural space.

Clause 27. The system of clauses 25 or clause 16, wherein the grow cycle schedule is based on a strain of a crop growing in the indoor agricultural space.

Clause 28. The system of any of clauses 21 to 27, wherein the controller is further configured to: establish a ratio of a cooling loop output to a heating loop output to satisfy a demand of the indoor agricultural space; determine the maximum number of air handling units that may be operated in cooling mode and the maximum number of air handling units that may be operated in heating mode in accordance with the ratio of cooling loop output to heating loop output; and operate a first number of the plurality of air handling units in cooling mode that is equal to or less than the maximum number determined and operate a second number of the plurality of air handling units in heating mode that is equal to or less than the maximum number determined.

Clause 29. The system of clause 28, wherein the plurality of air handling units includes at least one variable speed water source heat pump, and the controller is further configured to: adjust a speed of the at least one variable speed water source heat pump based on a cooling demand or a heating demand.

Clause 30. The system of any of clauses 21 to 29, wherein the controller is further configured to: determine a number of the plurality of air handling units to operate in the cooling mode based on cooling demand; and operate the number of the plurality of air handling units in the cooling mode.

Clause 31. The system of any of clauses 21 to 30, wherein the controller is further configured to: determine a number of the plurality of air handling units to operate in the heating mode based on heating demand; and operating the number of air handling units in the heating mode.

Clause 32. The system of any of clauses 21 to 31, wherein the plurality of air handling units are water sourced heat pumps, and the first of the plurality of air handling units is a first of the water sourced heat pumps, and the second of the plurality of air handling units is a second of the water sourced heat pumps.

Clause 33. The system of any of clauses 21 to 32, wherein the plurality of air handling units are variable refrigerant flow air conditioning units, and the first of the plurality of air handling units is a first of the variable refrigerant flow air conditioning units, and the second of the plurality of air handling units is a second of the variable refrigerant flow air conditioning units.

Clause 34. The system of any of clauses 21 to 33, wherein the blower is a centrifugal blower.

Clause 35. The system of any of clauses 21 to 34, further comprising an air distribution system configured to direct the conditioned air into the indoor agricultural space.

Clause 36. The system of any of clauses 21 to 35, wherein the air distribution system is a closed air path.

Clause 37. A system for providing conditioned air an indoor agricultural space divided into grow rooms that are independent and distinct, the system comprising: a first plurality of air handling units that supplies conditioned air to a first common plenum for a first of the grow rooms, a second plurality of air handling units that supplies conditioned air to a second common plenum for a second of the grow rooms, the first common plenum and the second common plenum being separate and distinct from one another, first and second blowers fluidly coupled to the first and second common plenum, and a controller operatively coupled to the first and second plurality of air handling units and the first and second blowers, wherein the controller is configured to: operate first air handling units in respective ones of the first plurality of air handling units and the second plurality of air handling units in a cooling mode; and as the first air handling units are operated in the cooling mode, operate second air handling units in respective ones of the first plurality of air handling units and the second plurality of air handling units in a heating mode; wherein the first and second blowers are each configured to: mix the conditioned air supplied by the first plurality of air handling units, and the conditioned air supplied by the second plurality of air handling units; and move the conditioned air as mixed by the first plurality of air handling units to the first of the grow rooms via the first common plenum, and the conditioned air as mixed by the second plurality of air handling units to the second of the grow rooms via the second common plenum.

Clause 38. The system of clause 37, wherein the controller is further configured to adjust a property of the conditioned air supplied by at least one air handling unit in each of the first plurality of air handling units and the second plurality of air handling units, wherein the property of the conditioned air comprises an airflow rate or an airflow temperature of the conditioned air, wherein the property of the conditioned air is adjusted in accordance with a grow cycle schedule comprising at least one of a daytime humidity, a daytime temperature, a nighttime humidity, or a nighttime temperature.

Clause 39. The system of clause 38, wherein the grow cycle schedule comprises a first grow cycle schedule and a second grow cycle schedule that are different from one another, and the controller is configured to adjust the property includes adjusting the property of the conditioned air supplied by the at least one air handling unit in the first plurality of air handling units according to the first grow cycle schedule, and adjust the property of the conditioned air supplied by the at least one air handling unit in the second plurality of air handling units according to the second grow cycle schedule.

Clause 40. The system of any of clauses claims 37 to 39, wherein the first plurality of air handling units, and the second plurality of air handling units, are water source heat pumps connected to a common water loop.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method of conditioning air in an indoor agricultural space using a plurality of air handling units set up in an installation in which the plurality of air handling units supplies conditioned air to a common plenum, the method comprising:
   operating a first of the plurality of air handling units in a cooling mode;
   supplying a first conditioned air from the first of the plurality of air handling unit into a first supply ductwork; and as the first of the plurality of air handling units is operated in the cooling mode, operating a second of the plurality of air handling units in a heating mode;
   supplying a second conditioned air from the second of the plurality of air handling units into a second supply ductwork;
   mixing the first conditioned air from the first supply ductwork and the second conditioned air from the second supply ductwork supplied by the plurality of air handling units; and
   moving the conditioned air as mixed into the indoor agricultural space via the common plenum.

2. The method of claim 1, wherein the first of the plurality of air handling units and the second of the plurality of air handling units are operated in the installation to supply conditioned air to the common plenum in a parallel configuration.

3. The method of claim 1, wherein the first of the plurality of air handling units and the second of the plurality of air handling units are operated in the installation to supply conditioned air to the common plenum in a serial configuration.

4. The method of claim 1, further comprising adjusting a property of the conditioned air supplied by at least one of the plurality of air handling units, and the property comprises an airflow rate or an airflow temperature of the conditioned air.

5. The method of claim 4, wherein the property of the conditioned air is adjusted in accordance with a grow cycle schedule comprising at least one of a daytime humidity, a daytime temperature, a nighttime humidity, or a nighttime temperature.

6. The method of claim 5, wherein the grow cycle schedule is based on a current life cycle stage of a crop growing in the indoor agricultural space.

7. The method of claim 5, wherein the grow cycle schedule is based on a strain of a crop growing in the indoor agricultural space.

8. The method of claim 1, further comprising:
setting a ratio of a cooling loop output to a heating loop output to satisfy a demand of the indoor agricultural space;
determining the maximum number of air handling units that may be operated in cooling mode and the maximum number of air handling units that may be operated in heating mode in accordance with the set ratio of cooling loop output to heating loop output; and
operating a first number of the plurality of air handling units in cooling mode that is equal to or less than the maximum number determined and operating a second number of the plurality of air handling units in heating mode that is equal to or less than the maximum number determined.

9. The method of claim 8, wherein the plurality of air handling units includes at least one variable speed water source heat pump, and the method further comprises:
adjusting a speed of the at least one variable speed water source heat pump based on a cooling demand or a heating demand.

10. The method of claim 1, further comprising:
determining a number of the plurality of air handling units to operate in the cooling mode based on cooling demand of the indoor agricultural space; and
operating the number of the plurality of air handling units in the cooling mode.

11. The method of claim 1, further comprising:
determining a number of the plurality of air handling units to operate in the heating mode based on heating demand of the indoor agricultural space; and
operating the number of air handling units in the heating mode.

12. The method of claim 1, wherein the plurality of air handling units are water sourced heat pumps, operating the first of the plurality of air handling units includes operating a first of the water sourced heat pumps, and operating the second of the plurality of air handling units includes operating a second of the water sourced heat pumps.

13. The method of claim 1, wherein the plurality of air handling units are variable refrigerant flow air conditioning units, operating the first of the plurality of air handling units includes operating a first of the variable refrigerant flow air conditioning units, and operating the second of the plurality of air handling units includes operating a second of the variable refrigerant flow air conditioning units.

14. The method of claim 1, further comprising utilizing a centrifugal blower to at least one of mix or move the conditioned air.

15. The method of claim 1, wherein the installation includes an air distribution system, and moving the conditioned air comprises delivering the conditioned air as mixed into the indoor agricultural space by way of the air distribution system.

16. The method of claim 1, wherein the installation includes a closed air path, and the method further comprises:
circulating the conditioned air between the plurality of air handling units and the indoor agricultural space in the closed air path.

17. A method of conditioning air in an indoor agricultural space divided into grow rooms that are independent and distinct, using an installation with a first plurality of air handling units that supplies conditioned air to a first common plenum for a first of the grow rooms, and a second plurality of air handling units that supplies conditioned air to a second common plenum for a second of the grow rooms, the first common plenum and the second common plenum being separate and distinct from one another, the method comprising:
operating first air handling units in respective ones of the first plurality of air handling units and the second plurality of air handling units in a cooling mode; and as the first air handling units are operated in the cooling mode,
operating second air handling units in respective ones of the first plurality of air handling units and the second plurality of air handling units in a heating mode;
mixing the conditioned air supplied by the first plurality of air handling units, and the conditioned air supplied by the second plurality of air handling units; and
moving the conditioned air as mixed by the first plurality of air handling units to the first of the grow rooms via the first common plenum, and the conditioned air as mixed by the second plurality of air handling units to the second of the grow rooms via the second common plenum.

18. The method of claim 17, further comprising adjusting a property of the conditioned air supplied by at least one air handling unit in each of the first plurality of air handling units and the second plurality of air handling units,
wherein the property of the conditioned air is adjusted in accordance with a grow cycle schedule comprising at least one of a daytime humidity, a daytime temperature, a nighttime humidity, or a nighttime temperature.

19. The method of claim 18, wherein the grow cycle schedule comprises a first grow cycle schedule and a second grow cycle schedule that are different from one another, and wherein adjusting the property includes adjusting the property of the conditioned air supplied by the at least one air handling unit in the first plurality of air handling units according to the first grow cycle schedule, and adjusting the property of the conditioned air supplied by the at least one air handling unit in the second plurality of air handling units according to the second grow cycle schedule.

20. The method of claim 17, wherein the first plurality of air handling units, and the second plurality of air handling units, are water source heat pumps connected to a common water loop.

* * * * *